(12) United States Patent
Okamoto et al.

(10) Patent No.: US 9,483,093 B2
(45) Date of Patent: Nov. 1, 2016

(54) ELECTRONIC DEVICE AND METHOD FOR CONTROLLING A SETTING OF A MAXIMUM CONSUMPTION CURRENT

(71) Applicant: FUJITSU LIMITED, Kawasaki-shi, Kanagawa (JP)

(72) Inventors: Yoshihiro Okamoto, Kawasaki (JP); Tatsuya Fujiki, Kawasaki (JP); Toshihiro Miyamoto, Machida (JP)

(73) Assignee: FUJITSU LIMITED, Kawasaki (JP)

( * ) Notice: Subject to any disclaimer, the term of this patent is extended or adjusted under 35 U.S.C. 154(b) by 65 days.

(21) Appl. No.: 14/532,096

(22) Filed: Nov. 4, 2014

(65) Prior Publication Data

US 2015/0058642 A1    Feb. 26, 2015

Related U.S. Application Data

(63) Continuation of application No. PCT/JP2012/062190, filed on May 11, 2012.

(51) Int. Cl.
    *G06F 1/00*   (2006.01)
    *G06F 3/00*   (2006.01)
    *G06F 1/26*   (2006.01)
    *G06F 13/14*  (2006.01)
    *G06F 13/38*  (2006.01)
    *H04L 29/00*  (2006.01)

(52) U.S. Cl.
    CPC ............... *G06F 1/26* (2013.01); *G06F 13/14* (2013.01); *G06F 13/38* (2013.01); *H04L 29/00* (2013.01)

(58) Field of Classification Search
    CPC .................................................... G06F 1/3203
    USPC .......................................................... 713/300
    See application file for complete search history.

(56) References Cited

U.S. PATENT DOCUMENTS

| 6,798,173 B2 * | 9/2004 | Hsu .............................. 320/134 |
| 7,711,870 B2 * | 5/2010 | Yoshida et al. ................. 710/16 |
| 8,281,048 B2 * | 10/2012 | Fujii et al. ...................... 710/16 |

(Continued)

FOREIGN PATENT DOCUMENTS

| JP | 2003-195985 | 7/2003 |
| JP | 2009-260563 | 11/2009 |

(Continued)

OTHER PUBLICATIONS

International Search Report, mailed in connection with JP2012/062190 and mailed Jun. 19, 2012.

KROA—Notice of Preliminary Rejection issued by Korean Intellectual Property Office dated Dec. 16, 2015, with English translation.

(Continued)

*Primary Examiner* — Suresh Suryawanshi
(74) *Attorney, Agent, or Firm* — Fujitsu Patent Center

(57) ABSTRACT

An electronic device includes a communication connector, a determiner, and a setting controller. The communication connector includes a power supply terminal and a plurality of signal terminals. The determiner determines whether a device connected via the communication connector is a device capable of communicating according to a second communication standard, based on the potential of a predetermined signal terminal specified by a first communication standard but not specified by the second communication standard, among the signal terminals. The setting controller switches the setting related to a power supply signal input from the power supply terminal, according to the determination result of the determiner.

14 Claims, 16 Drawing Sheets

(56) References Cited

U.S. PATENT DOCUMENTS

| | | | | |
|---|---|---|---|---|
| 8,601,173 | B2* | 12/2013 | Sung et al. | 710/15 |
| 8,856,420 | B2* | 10/2014 | Chandra et al. | 710/315 |
| 9,047,073 | B2* | 6/2015 | Ozaki et al. | |
| 9,229,833 | B2* | 1/2016 | Wetzel et al. | |
| 2006/0003801 | A1* | 1/2006 | Hattori | 455/552.1 |
| 2011/0167177 | A1 | 7/2011 | Kouyama et al. | |
| 2012/0030485 | A1 | 2/2012 | Kawano | |
| 2014/0103864 | A1* | 4/2014 | Song | 320/107 |

FOREIGN PATENT DOCUMENTS

| | | |
|---|---|---|
| JP | 2011-138465 | 7/2011 |
| JP | 2011-203781 | 10/2011 |
| KR | 10-0700532 B1 | 3/2007 |
| WO | 2005/119411 A2 | 12/2005 |
| WO | 2011/157243 A2 | 12/2011 |

OTHER PUBLICATIONS

EESR—The extended European Search Report issued on Aug. 3, 2015 for corresponding European Application No. 12876194.7.

Hewlett-Packard Company, et al; "Universal Serial Bus 3.0 Specification. Revision 1.0"; Nov. 12, 2008; pp. 1-482 ; XP055203464; Retrieved on Jul. 22, 2015 from URL:http://www.gaw.ru/pdf/interface/usb/USB%203%200_english.pdf.

JPOA—Office Action mailed Sep. 1, 2015 for corresponding Japanese Application No. 2014-514334, with English translation of relevant part: p. 1 line 21 to p. 3 line 19 and p. 3 line 23 to 24.

JPOA—Office Action mailed Mar. 15, 2016 for corresponding Japanese Application No. 2014-514334, with English translation of relevant part: p. 1 line 14 to p. 3 line 2; and p. 3 line 5 to p. 3 line 10.

USB Implementers Forum, Inc. (USB-IF), "On-The-Go Supplement to the USB 2.0 Specification Revision 1.3", Dec. 5, 2006, p. 12-24, http://www.usb.org/developers/docs/USB_OTG_1-3.pdf.

* cited by examiner

IN STATE WHERE USB 3.0 DEVICE IS CONNECTED

IN STATE WHERE USB 3.0 DEVICE IS NOT CONNECTED

ELECTRONIC DEVICE AND METHOD FOR CONTROLLING A SETTING OF A MAXIMUM CONSUMPTION CURRENT

CROSS-REFERENCE TO RELATED APPLICATION

This application is a continuation application of International Application PCT/JP2012/062190 filed on May 11, 2012 which designated the U.S., the entire contents of which are incorporated herein by reference.

FIELD

The embodiments discussed herein relate to electronic devices and methods for controlling the same.

BACKGROUND

Some communication standards for electronic devices to communicate with each other may allow one electronic device to supply electric power to another electronic device through a communication cable. The typical communication standard is USB (Universal Serial Bus). For example, a portable electronic device, which is difficult to receive an electric power from a commercial alternating current power supply, may be activated to perform a normal operation or charge a built-in battery by being powered through a communication cable.

Moreover, the specification related to the electric power supplied through a communication cable differs depending on the communication standard. For example, in the case of USB, in each of the USB 1.1 standard and the USB 2.0 standard, the output voltage is 5 V and the output current is 0.5 A. In contrast, in the USB 3.0 standard, the output voltage is also 5 V but the output current is 0.9 A.

Note that examples of the technique for determining the communication standard, which a connected electronic device supports, include an electronic device configured to determine the communication standard, which a connected host device supports, based on the potential of a communication ground terminal in the USB 3.0 standard among the terminals of a connector supporting both the USB 2.0 standard and the USB 3.0 standard.

Japanese Laid-open Patent Publication No. 2011-203781

As described above, in an electronic device powered through a communication cable, the electric power to be supplied is preferably larger. For example, in electronic devices, as the electric power to be supplied increases, the charging of a built-in battery may be completed in a shorter time.

As with the USB standard, in the case of a communication standard, in which the specification of the power supply differs depending on the generation of the communication standard and the physical backward compatibility of a communication cable is ensured, one of connected electronic devices may support an old communication standard while the other one may support a new communication standard. In this case, although the other connected electronic device has a larger power supply capability specified by the new communication standard, the electronic device supporting the old communication standard sets the setting related to the supplied electric power so as to consume only a small electric power specified by the old communication standard. Because the electronic device supporting the old communication standard is unable to determine whether the other connected electronic device supports the new communication standard.

SUMMARY

According to an aspect of the embodiments, there is provided an electronic device including: a communication connector including a power supply terminal and a plurality of signal terminals; a determiner configured to determine, based on a potential of a predetermined terminal specified by a first communication standard but not specified by a second communication standard among the plurality of signal terminals, whether a device connected via the communication connector is a device capable of communicating according to the second communication standard; and a setting controller configured to switch a setting related to a power supply signal input from the power supply terminal according to a determination result of the determiner.

The object and advantages of the invention will be realized and attained by means of the elements and combinations particularly pointed out in the claims.

It is to be understood that both the foregoing general description and the following detailed description are exemplary and explanatory and are not restrictive of the invention.

DESCRIPTION OF EMBODIMENTS

Hereinafter, embodiments disclosed herein will be described with reference to the accompanying drawings.

First Embodiment

Figure 1:
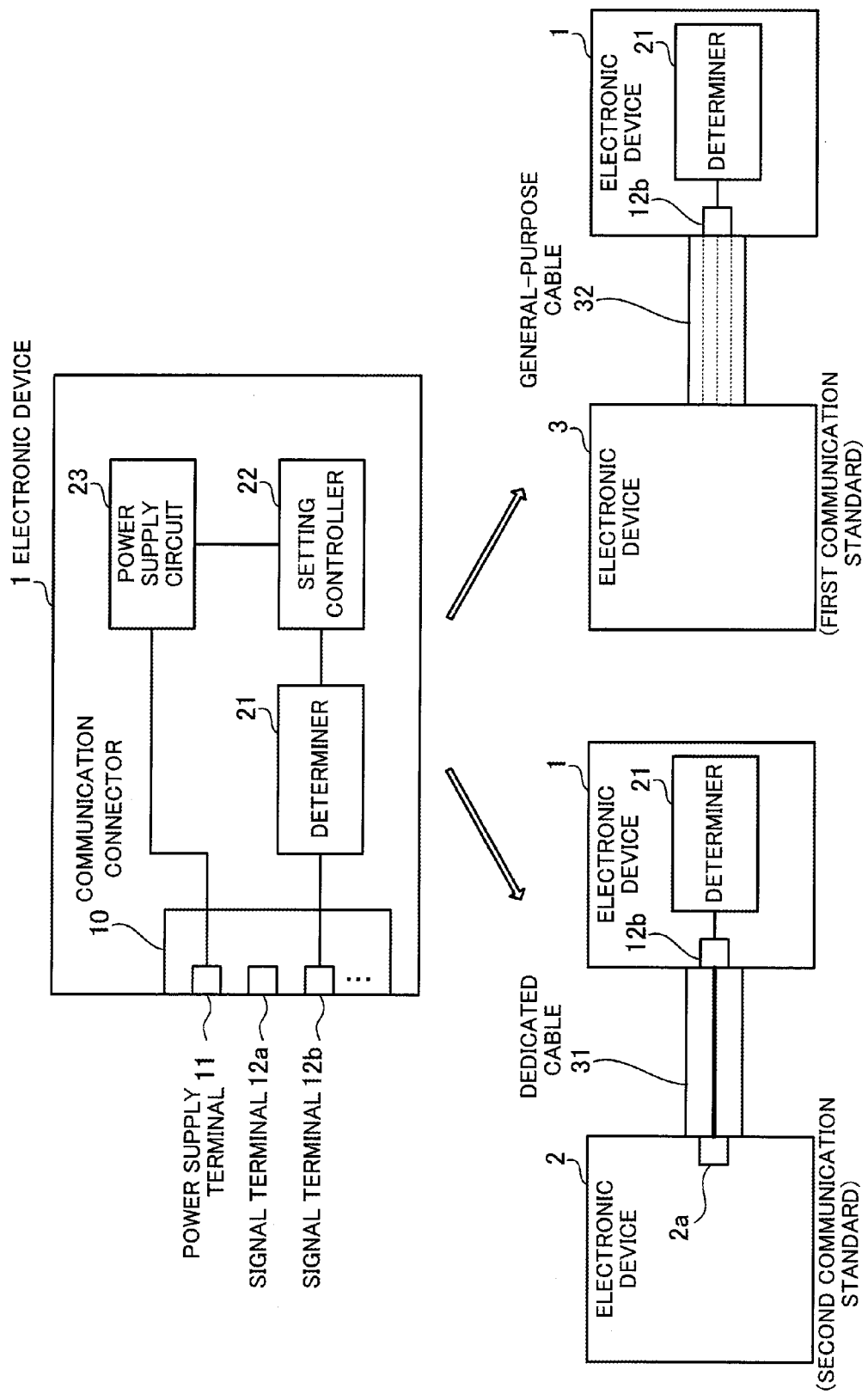
FIG. 1 is a diagram illustrating a configuration example of an electronic device according to a first embodiment and an example of the operation thereof.

FIG. 1 is a diagram illustrating a configuration example of an electronic device according to a first embodiment and an example of the operation thereof.

An electronic device 1 communicates according to a first communication standard. The electronic device 1 includes a communication connector 10, a determiner 21, and a setting controller 22.

The communication connector 10 supports the first communication standard and includes a power supply terminal 11 and a plurality of signal terminals 12a, 12b, . . . .

A power supply signal is supplied to the power supply terminal 11 from the other device connected via the communication connector 10. The power supply signal supplied from the power supply terminal 11 is, for example, input to the power supply circuit 23 included in the electronic device 1, and an electric power is supplied to each unit inside the electronic device 1 from the power supply circuit 23. The electronic device 1 may operate based on the power supply signal supplied from the power supply terminal 11 or may operate based on a power supply (e.g., a battery included in the electronic device 1) other than this power supply signal.

When the other device connected via the communication connector 10 is a device configured to communicate according to the first communication standard, a power supply signal of a specification specified by the first communication standard is supplied to the power supply terminal 11. On the other hand, when the other device connected via the communication connector 10 is a device configured to communicate according to a second communication standard, a power supply signal of a specification specified by the second communication standard is supplied to the power supply terminal 11. Between the first communication standard and the second communication standard, for example, the maximum power supplied to the power supply terminal 11 differs.

The signal terminals 12a, 12b, . . . are the terminals specified by the first communication standard. Here, even when the other device capable of communicating according to the second communication standard is connected, the electronic device 1 may communicate with the other device according to the first communication standard through at least some of the plurality of signal terminals 12a, 12b, . . . . For example, the second communication standard is a communication standard, among the communication standards of the same system, of a generation newer than the first communication standard and is backward compatible with the first communication standard.

The determiner 21 determines whether the other connected device is a device capable of communicating according to the second communication standard, based on the potential of a predetermined terminal which is not specified by the second communication standard among the plurality of signal terminals 12a, 12b, . . . . In the example of FIG. 1, the determiner 21 determines based on the potential of the signal terminal 12b. Note that the signal terminal 12b is preferably a terminal which is not used when a device capable of communicating according to the second communication standard is connected.

The setting controller 22 switches the setting related to the power supply signal input from the power supply terminal 11, according to a determination result made by the determiner 21. In the example of FIG. 1, the setting controller 22 instructs the power supply circuit 23 to switch the setting related to the power supply signal. The setting related to the power supply signal includes the maximum consumption current, for example. As described above, since the specification of the power supply signal differs between the first communication standard and the second communication standard, the setting controller 22 switches the setting related to the power supply signal so as to support the specification of the power supply signal specified by the communication standard which the other connected device supports.

Although such an electronic device 1 is specified by the first communication standard, the electronic device 1 determines whether the other connected device is a device capable of communicating according to the second communication standard, based on the potential of the signal terminal 12b which is not specified by the second communication standard. Thus, even without having a function to communicate according to the second communication standard, the electronic device 1 may detect that a device capable of communicating according to the second communication standard has been connected, and switch the setting related to the power supply signal so as to support the specification specified by the second communication standard.

Next, an operation example when the other device is connected to the electronic device 1 is described. Here, a case is described, where the signal terminal 12b is a terminal which is not used when a device capable of communicating according to the second communication standard is connected.

As illustrated on the lower left of FIG. 1, the other electronic device 2 capable of communicating according to the second communication standard is connected to the electronic device 1 via a dedicated communication cable (dedicated cable 31), for example. In this case, the electronic device 1 may receive a power supply signal output from the electronic device 2 through the power supply terminal 11. At the same time, the electronic device 1 may communicate with the electronic device 2 through another signal terminal excluding the signal terminal 12b among the plurality of signal terminals 12a, 12b, . . . according to the first communication standard.

For example, a reception terminal 2a for receiving data according to the second communication standard among the terminals of the electronic device 2 and the signal terminal 12b of the communication connector 10 are wired to each other with the dedicated cable 31. In this case, the determiner 21 of the electronic device 1 may recognize that the electronic device 2 capable of communicating according to the second communication standard has been connected, based on the potential of the signal terminal 12b. For example, inside the electronic device 2, the reception terminal 2a is terminated by a non-illustrated termination resistor. The determiner 21 of the electronic device 1 may output a determination signal to the signal terminal 12b via a coupling capacitor, for example, and determine, from a variation state of the potential on the opposite side of the signal terminal 12b of the coupling capacitor, whether the other end of a connection line connected to the signal terminal 12b in the dedicated cable 31 is terminated. Then, when the determiner 21 has determined that the termination resistor is connected to the other end of the connection line, the determiner 21 determines that the electronic device 2 capable of communicating according to the second communication standard is connected.

On the other hand, as illustrated on the lower right of FIG. 1, the other electronic device 3 configured to communicate according to the first communication standard is connected to the electronic device 1 with a general-purpose communication cable (general-purpose cable 32) supporting the first communication standard, for example. In this case, the other end of the connection line, to which the signal terminal 12b in the general-purpose cable 32 is also connected, is not connected to the reception terminal 2a and is not terminated by the termination resistor. From the variation state of the potential when the determination signal is output to the signal terminal 12b via the coupling capacitor, the determiner 21 of the electronic device 1 may detect that the other end of the connection line is not terminated, thereby determining that the other electronic device capable of communicating according to the second communication standard is not connected.

When the electronic device 1 may detect that the other electronic device 3 configured to communicate according to the first communication standard is connected, based on the potential of a terminal other than the signal terminal 12b, the electronic device 1 may use the signal terminal 12b using a method specified by the first communication standard.

According to the above-described operation example, the electronic device 1 may detect that a device capable of communicating according to the second communication standard has been connected, and switch the setting related to the power supply signal so as to support the specification specified by the second communication standard.

Second Embodiment

Figure 2:
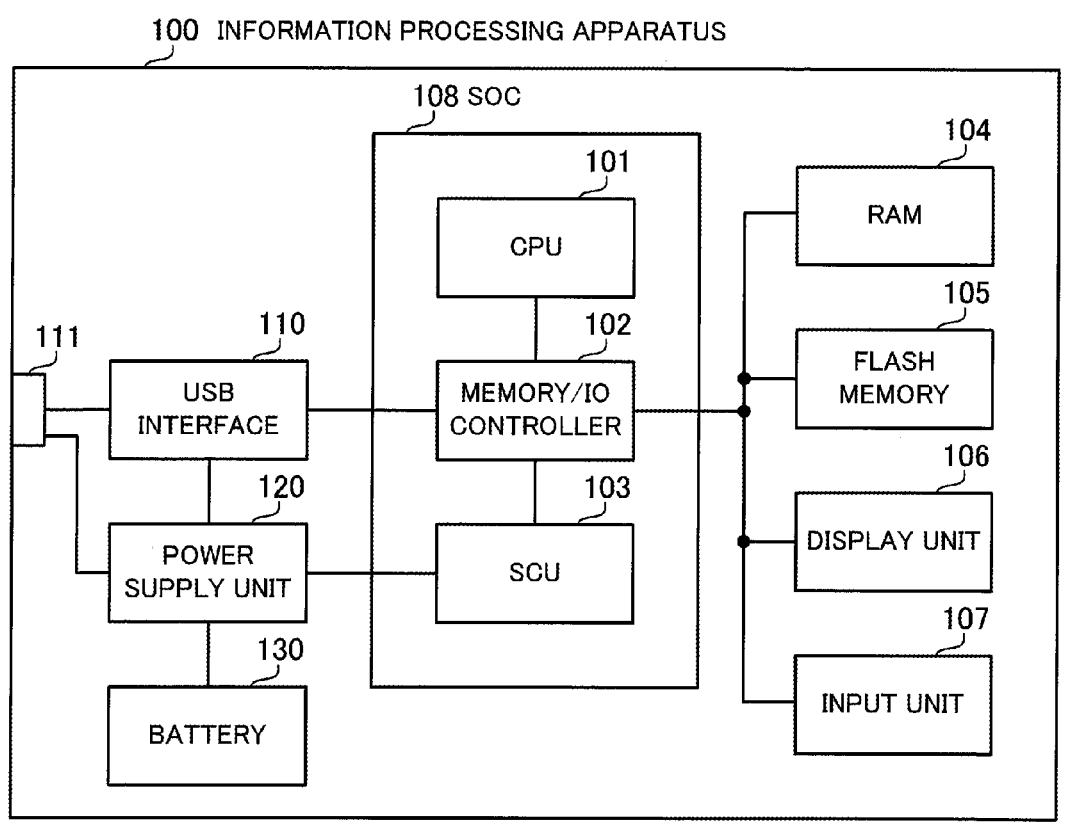
FIG. 2 is a diagram illustrating a hardware configuration example of an information processing apparatus according to a second embodiment.

Next, an information processing apparatus with a USB interface is described as an example of the electronic device. FIG. 2 is a diagram illustrating a hardware configuration example of an information processing apparatus according to a second embodiment.

An information processing apparatus 100 illustrated in FIG. 2 may communicate according to the USB 2.0 standard and the USB OTG (On The Go) standard which is an extended specification of the USB 2.0 standard. Moreover, the information processing apparatus 100 is the "dual role device" specified by the USB OTG standard, and is configured to be operable as a USB device as well as a USB host. Here, the "USB host" is a host side device specified by the USB standard, and the "USB device" is a slave side device specified by the USB standard.

In the description below, a device supporting the USB 2.0 standard is called a "USB 2.0 device", a device supporting the USB OTG standard among the USB 2.0 devices is called an "OTG device", and a device supporting the USB 3.0 standard is called a "USB 3.0 device."

The whole information processing apparatus 100 is controlled by a CPU (Central Processing Unit) 101. A RAM (Random Access Memory) 104 and a plurality of peripheral devices are connected to the CPU 101 via a memory/IO (In/Out) controller 102.

The RAM 104 is used as the main storage device of the information processing apparatus 100. At least part of an OS (Operating System) program and an application program executed by the CPU 101 is temporarily stored in the RAM 102. Moreover, various types of data needed for processing by the CPU 101 are stored in the RAM 104.

The peripheral devices connected to the memory/IO controller 102 include a flash memory 105, a display unit 106, an input unit 107, an SCU (System Control Unit) 103, a USB interface 110, and the like.

The flash memory 105 is used as a secondary storage device of the information processing apparatus 100. The OS program, application program, and various types of data are stored in the flash memory 105. Note that another type of nonvolatile storage device, such as an HDD (Hard Disk Drive), may be used as the secondary storage device.

The display unit 106 includes a monitor, such as a liquid crystal display, for displaying an image. The display unit 106 displays an image according to an instruction from the CPU 101. The input unit 107 includes a predetermined input device, such as an operation key, and transmits a signal corresponding to an input operation with respect to the input device, to the CPU 101.

The SCU 103 is a sub-CPU for controlling a later-described power supply unit 120 according to an instruction from the CPU 101.

Note that, the CPU 101, memory/IO controller 102, and SCU 103 are mounted on an SOC (System On Chip) 108, for example.

The USB interface 110 is an interface circuit for communicating through a USB socket 111 according to the USB 2.0 standard and USB OTG standard. The USB socket 111 is a socket called "micro AB" that may be used as a socket on the USB host side or on the USB device side or on both sides. Note that the USB socket 111 may be a socket called "mini AB."

The power supply unit 120 is connected to the USB socket 111 and the battery 130. The power supply unit 120 transforms a power-supply voltage supplied from the USB socket 111 or the battery 130, and supplies the resulting voltage to each unit inside the information processing apparatus 100. Moreover, the power supply unit 120 may apply the power-supply voltage supplied from the USB socket 111 to the battery 130 to charge the battery 130. Furthermore, the power supply unit 120 may transform the power-supply voltage supplied from the battery 130, and supply the resulting voltage to another device through the USB socket 111.

The above-described information processing apparatus 100 may be realized as a portable information processing apparatus, for example, such as an information terminal having a portable telephone function, a tablet type terminal, an audio player, and a digital camera.

Figure 3:
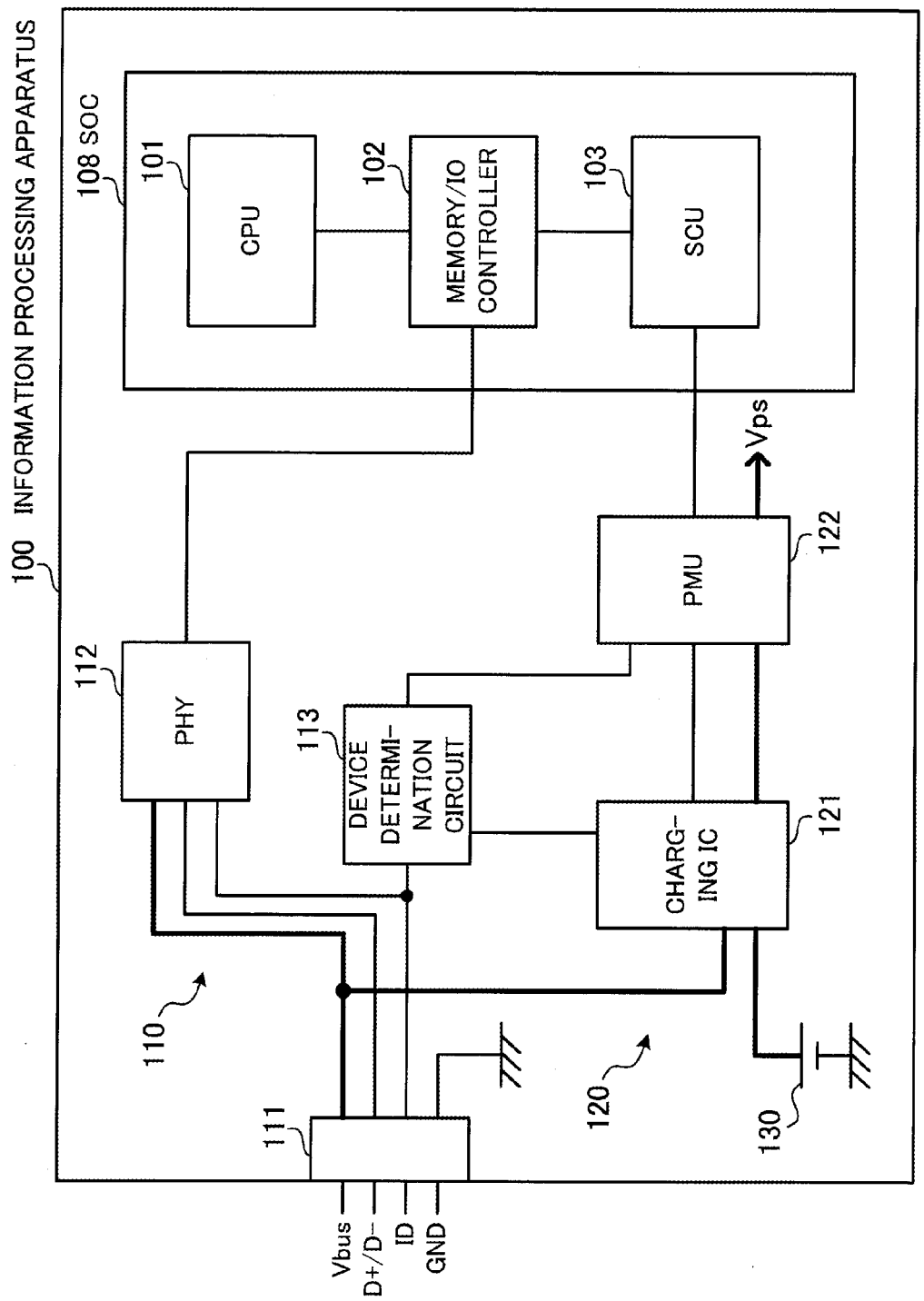
FIG. 3 is a diagram illustrating a configuration example of a USB interface and power supply unit.

FIG. 3 is a diagram illustrating a configuration example of the USB interface and power supply unit. Note that thick lines of FIG. 3 indicate the paths for applying the power-supply voltage.

The USB interface 110 includes a PHY (physical layer circuit) 112 and a device determination circuit 113. The power supply unit 120 includes a charging IC (Integrated Circuit) 121 and a PMU (Power Management Unit) 122.

Moreover, the USB socket 111 includes a Vbus terminal, a D+ terminal, a D− terminal, an ID terminal, and a GND terminal. The Vbus terminal is a terminal to which the power supply signal of 5 V is transmitted. The D+ terminal and D− terminal are data terminals to which data is transmitted according to the USB 2.0 standard and USB OTG standard. The ID terminal is a terminal specified by the USB OTG standard, and is used to determine whether the other connected device is a USB host or a USB device. The GND terminal is a terminal to be set to the earth potential.

The charging IC 121 has a function to supply a system power to the PMU 122, a function to charge the battery 130, and the like. The PMU 122 has a function to receive an instruction from the CPU 101 through the SCU 103 and control the operation of the charging IC 121, a function to boost the system power supplied from the charging IC 121 and supply the resulting power to each unit inside the information processing apparatus 100, and the like.

When the information processing apparatus 100 operates as a USB device, the charging IC 121 supplies a power-supply voltage, which is supplied from the Vbus terminal, to the PMU 122 and supplies this power-supply voltage to the battery 130 to charge the battery 130. On the other hand, when the information processing apparatus 100 operates as a USB host, the charging IC 121 supplies a power-supply voltage, which is supplied from the battery 130, to the PMU 122 and supplies a power-supply voltage of 5 V to the other device from the Vbus terminal.

The PHY 112 notifies the CPU 101 of the received signal that is based on the potentials of the D+ terminal and D− terminal, through the memory/IO controller 102. The PHY 112 transmits a transmission signal, which is instructed from the CPU 101, to the other device through the D+ terminal and D− terminal. The PHY 112 transmits and receives a signal according to the USB 2.0 standard or USB OTG standard under the control of the CPU 101.

Furthermore, the PHY 112 has a function to notify the other device of the presence of the information processing apparatus (i.e., the information processing apparatus 100) when a power-supply voltage is supplied to the Vbus terminal from the other device, a function to determine whether or not another device is a USB device, based on the potential of the ID terminal, and the other functions.

The device determination circuit 113 determines whether a USB 3.0 device is connected, based on the potential of the ID terminal, and notifies the PMU 122 of the determination result. As described later, the device determination circuit 113 includes a coupling capacitor, and outputs a detection signal to the ID terminal via the coupling capacitor, thereby determining whether a USB 3.0 device is connected. Because the information processing apparatus 100 includes the device determination circuit 113, the information processing apparatus 100 may, though not supporting the USB 3.0 standard, recognize that a USB 3.0 device has been connected.

Figure 4:
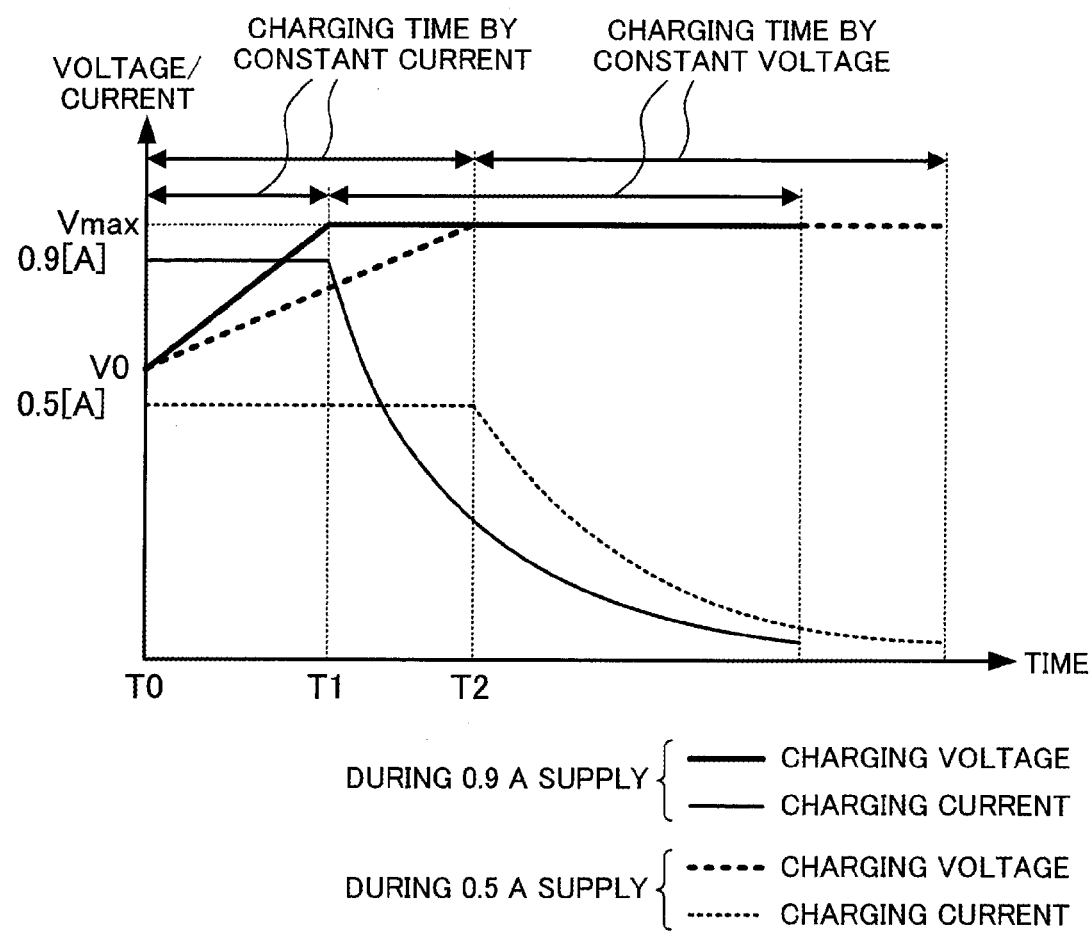
FIG. 4 is a graph illustrating an example of a charging voltage and charging current of a lithium ion battery.

Next, FIG. 4 is a graph illustrating an example of a charging voltage and charging current of a lithium ion battery.

Usually, the charging time of a battery decreases as the charging current is increased.

For example, in the case of a lithium ion battery, as illustrated in FIG. 4, constant-current charging (precharge) is performed in the first period from the start of charging, and once the voltage of the battery reaches a predetermined upper limit voltage Vmax, constant-voltage charging is performed.

The period during which the constant-current charging is performed, i.e., the time taken for the voltage of the battery to reach an upper limit voltage Vmax, decreases as the charging current increases. FIG. 4 illustrates, as an example, a case where the battery is charged with a constant current of 0.9 A and a case where the battery is charged with a constant current of 0.5 A. The charging period (from time instant T0 to T1) by the constant current of 0.9 A is shorter than the charging period (from time instant T0 to T2) by the constant current of 0.5 A.

Moreover, as illustrated in FIG. 4, the charging amount charged with the constant current is significantly larger than the charging amount charged with the constant voltage because the charging current gradually decreases in the period during which the constant-voltage charging is performed. Therefore, by increasing the charging current and thus reducing the charging time by the constant current, the charging of the battery may be completed quickly.

In the USB 2.0 standard and USB OTG standard, the rated value of the current supplied through the Vbus terminal is 0.5 A. On the other hand, in the USB 3.0 standard, the rated value of the current supplied through the Vbus terminal is 0.9 A. Accordingly, a USB device is supposed to be able to charge the battery in a shorter time in a case where it is connected to a USB host supporting the USB 3.0 standard than in a case where it is connected to a USB host supporting the USB 2.0 standard or USB OTG standard.

Moreover, a USB host supporting the USB 3.0 standard may communicate according to not only the USB 3.0 standard but the USB 2.0 standard (however, excluding the USB OTG standard). Therefore, a USB host supporting the USB 3.0 standard is often connected to a USB device not supporting the USB 3.0 standard. Accordingly, even a USB device not supporting the USB 3.0 standard may have many opportunities to receive the supply of the current of 0.9 A through the Vbus terminal.

However, a USB device not supporting the USB 3.0 standard does not include a unit configured to recognize that a connected USB host supports the USB 3.0 standard. Therefore, the charging circuit of a USB device not supporting the USB 3.0 standard is set so as to restrict the upper limit (i.e., the upper limit of the consumption current during charging) of the charging current to 0.5 A regardless of whether or not a USB 3.0 device is connected. Accordingly, even if a USB 3.0 device is connected, the time taken for charging will not be reduced.

Moreover, the USB 2.0 standard includes a specification supposing charging with a current exceeding 0.5 A. The USB 2.0 standard includes a specification, called "USB battery charging specification", for supplying power to the Vbus terminal. Then, in the USB battery charging specification, a special USB host is defined that enables an output of current exceeding 0.5 A, called CDP (Charging Downstream Port) and DCP (Dedicated Charger Port).

However, both CDP and DCP are configured to be connected to the USB port of a USB device supporting the USB 2.0 standard. For this reason, regarding both CDP and DCP, a specification departing from the specification intrinsic to the USB 2.0 standard is not obligatorily defined. Specifically, regarding both CDP and DCP, the output current of 0.5 A is just guaranteed at minimum. Therefore, a USB device not supporting the USB 3.0 standard may not necessarily receive a current exceeding 0.5 A even in a case where CDP or DCP is connected thereto.

Furthermore, in the USB battery charging specification Rev. 1.2, the minimum value of the output current of CDP has been increased to 1.5 A. However, a method has not been defined yet for discriminating the USB battery charging specification Rev. 1.2 from the USB battery charging specification Rev. 1.1 in which the minimum value of the output current of CDP is 0.5 A.

From these reasons, it is needed that a USB device not supporting the USB 3.0 standard performs the setting for restricting the upper limit of the charging current to 0.5 A, with respect to the internal charging IC. Accordingly, it is not possible to reduce the charging time by effectively utilizing an input current exceeding 0.5 A.

In contrast, the information processing apparatus 100 of the embodiment may determine whether the other connected device supports the USB 3.0 standard, using the device determination circuit 113. Thus, the information processing apparatus 100 may, though not supporting the USB 3.0 standard, recognize that a USB host supporting the USB 3.0 standard has been connected. Accordingly, the information processing apparatus 100 may optimize the setting of the charging IC 121 to the input current of 0.9 A and complete the charging of the battery 130 in a shorter time.

The device determination circuit 113 determines whether the other connected device supports the USB 3.0 standard, based on the potential of the ID terminal, which is not used when a USB host supporting the USB 3.0 standard is connected, among the terminals of the USB socket 111. Moreover, the device determination circuit 113 determines whether the other connected device supports the USB 3.0 standard, by using a connection detection method that is executed between USB 3.0 devices.

Hereinafter, the connection detection method executed between USB 3.0 devices is described using FIG. 5 to FIG. 7.

Figure 5:
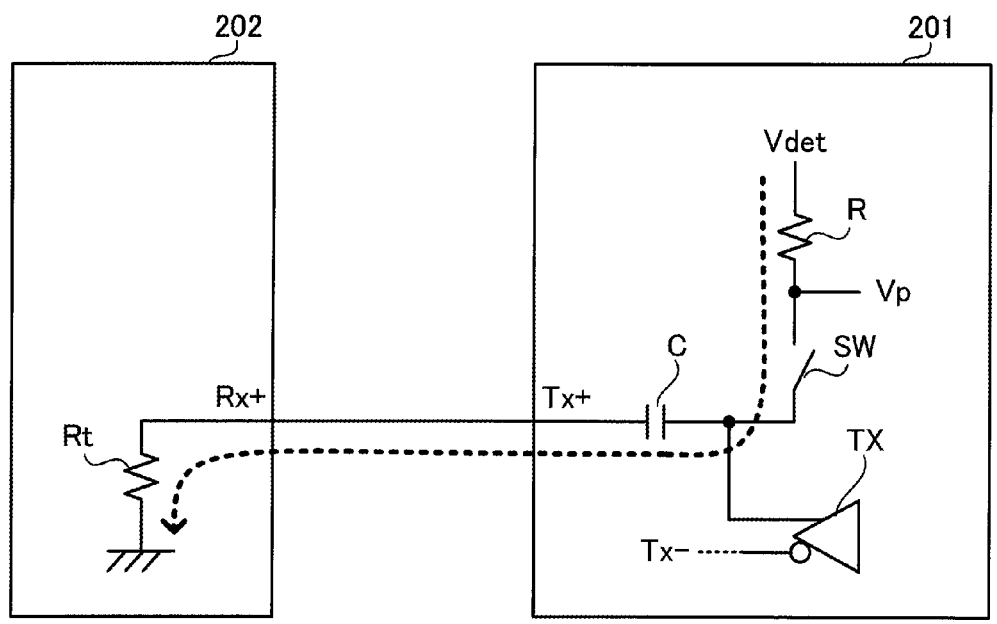
FIG. 5 is a diagram illustrating a configuration example of a connection detecting circuit of a USB 3.0 device and an example of the operation thereof.
Figure 6:
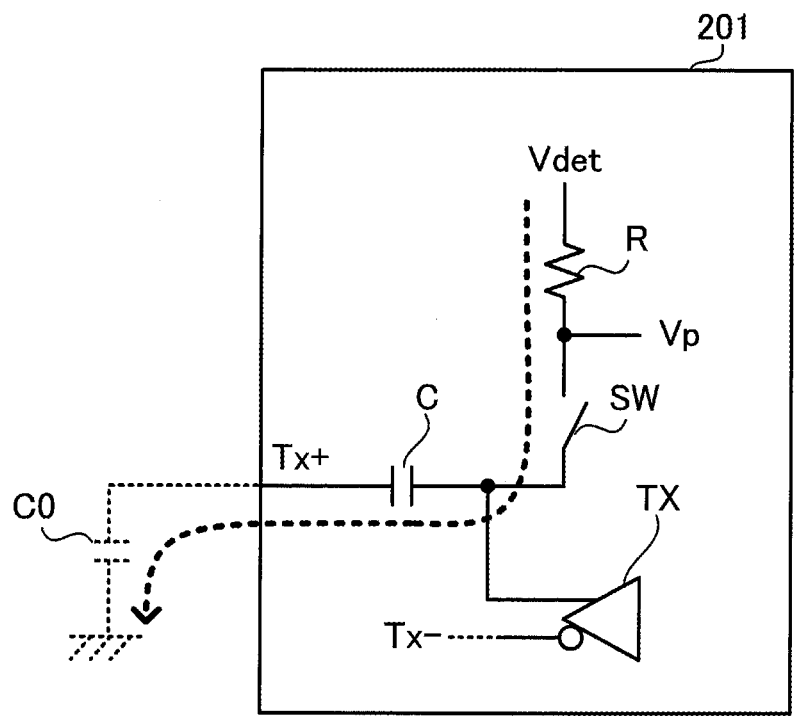
FIG. 6 is a diagram illustrating a configuration example of the connection detecting circuit of a USB 3.0 device and an example of the operation thereof.

FIG. 5 and FIG. 6 are diagrams illustrating a configuration example of a connection detecting circuit of a USB 3.0 device and an example of the operation thereof.

Both electronic devices 201 and 202 illustrated as a reference example in FIG. 5 and FIG. 6 are the devices supporting the USB 3.0 standard. The electronic device 201 may be a USB host or may be a USB device. When the electronic device 201 is a USB host, the electronic device 201 serves as a USB device, while when the electronic device 201 is a USB device, the electronic device 201 serves as a USB host. Moreover, although not illustrated, the electronic device 202 also includes the circuit which the electronic device 201 illustrated in FIG. 5 includes, and the electronic device 201 also includes the circuit which the electronic device 202 illustrated in FIG. 5 includes.

A USB socket supporting the USB 3.0 standard includes a Tx+ terminal and Tx− terminal for transmitting data, and an Rx+ terminal and Rx− terminal for receiving data. The Tx+ terminal and Tx− terminal are differential output terminals, and the Rx+ terminal and Rx− terminal are differential input terminals.

As illustrated in FIG. 5, inside the electronic device 201, a coupling capacitor C for AC coupling is connected between a positive side output terminal of a transmission circuit TX and the Tx+ terminal. Note that the transmission circuit TX constitutes a part of the PHY of the electronic device 201. The capacitance of the coupling capacitor C is 75 nF to 200 nF, for example.

Moreover, as an example of the connection detection circuit, a resistor R and a switch SW are connected between the positive side output terminal of the transmission circuit TX and the coupling capacitor C. A detection voltage Vdet is applied to one end of the resistor R, and the other end of the resistor R is connected to the coupling capacitor C via the switch SW.

On the other hand, the Rx+ terminal of the electronic device 202 is connected to the Tx+ terminal of the electronic device 201 via a non-illustrated USB cable. Inside the electronic device 202, the Rx+ terminal is terminated to the ground via a termination resistor Rt matching with the characteristic impedance of a signal cable. The termination resistor Rt has a resistance value of approximately 50Ω, for example.

When the electronic device 202 is a USB host, the electronic device 202 at least brings the termination resistor Rt into a connection state while waiting for a USB device to be connected to the electronic device 202 through hot plug. On the other hand, even when the electronic device 202 is a USB device, the electronic device 202 at least brings the termination resistor Rt into a connection state in order to cause a USB host to recognize the electronic device 202 through hot plug. Then, the USB host and the USB device recognize the presence of a connection party by mutually confirming the presence of the termination resistor in the reception circuit on the other party, and then execute a training sequence for establishing a link.

Hereinafter, the operation of detecting the presence or absence of connection by confirming the presence of the termination resistor Rt is described using FIG. 5 and FIG. 6. The electronic device 201 outputs a connection detection signal of a constant interval to the Tx+ terminal by periodically turning on the switch SW for a fixed time, and detects an observation voltage Vp between the resistor R and the coupling capacitor C.

As illustrated in FIG. 5, when the electronic device 202 is connected, the connection detection signal from the electronic device 201 flows into the termination resistor Rt via the Rx+ terminal of the electronic device 202. Then, the coupling capacitor C is charged by the connection detection signal.

On the other hand, as illustrated in FIG. 6, in a state where nothing is connected to the Tx+ terminal of the electronic device 201, the capacitor of the coupling capacitor C with respect to the ground is connected in series to a stray capacitance C0 that is present when the Tx+ terminal is opened. The stray capacitance has the capacitance of 0 pF to 10 pF, for example. Then, the whole of the coupling capacitor C and stray capacitance C0 will be charged by the output of the connection detection signal.

Figure 7:
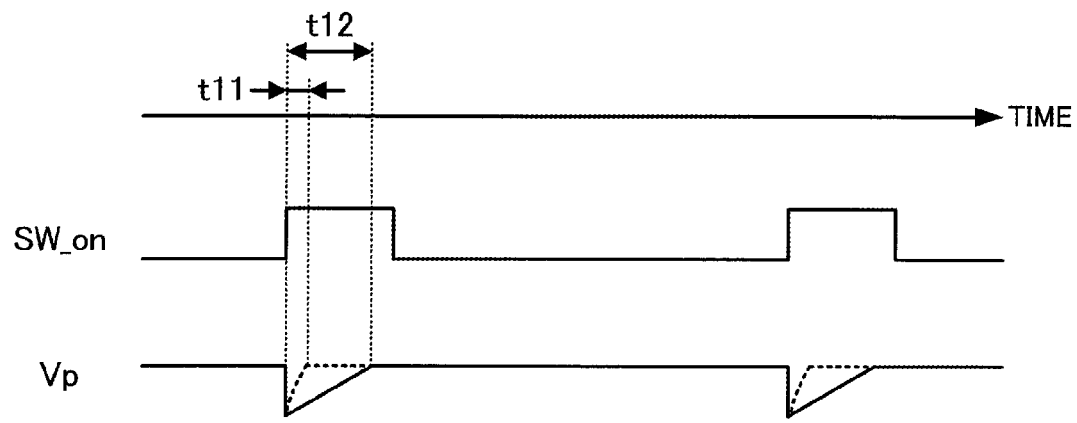
FIG. 7 is a chart illustrating an example of waveforms when a connection detection signal is output.

FIG. 7 is a chart illustrating an example of waveforms when the connection detection signal is output.

SW_on in FIG. 7 is the waveform indicating the timing of on/off of the switch SW of FIG. 5, and is "1" when the switch SW is on and "0" when it is off. Moreover, in the waveforms of the observation voltage Vp illustrated in FIG. 7, the waveform of a solid line is the waveform when a USB 3.0 device (the electronic device 202 of FIG. 5) is connected to the Tx+ terminal of the electronic device 201, and the waveform of a dotted line is the waveform when nothing is connected to the Tx+ terminal of the electronic device 201.

As described in FIG. 6, in the state where nothing is connected to the Tx+ terminal, between the coupling capacitor C and the ground the termination resistor Rt is not connected but the stray capacitance C0 sufficiently smaller than the coupling capacitor C is connected. Therefore, a droop time of the observation voltage Vp after turning on of the switch SW (i.e., a time taken to charge the whole capacitance) is longer in the case where a USB 3.0 device is connected to the Tx+ terminal (a time period t12 in FIG. 7) than in the case where nothing is connected to the Tx+ terminal (a time period t11 in FIG. 7). The electronic device 201 may determine whether or not a USB 3.0 device has been connected, by measuring the droop time of the observation voltage Vp after turning on of the switch SW.

Note that, in the above FIG. 5 to FIG. 7, an example of confirming the presence of the termination resistor Rt through the Rx+ terminal has been illustrated, but a method for confirming the presence of the termination resistor Rt through the Rx− terminal may be used.

Figure 8:
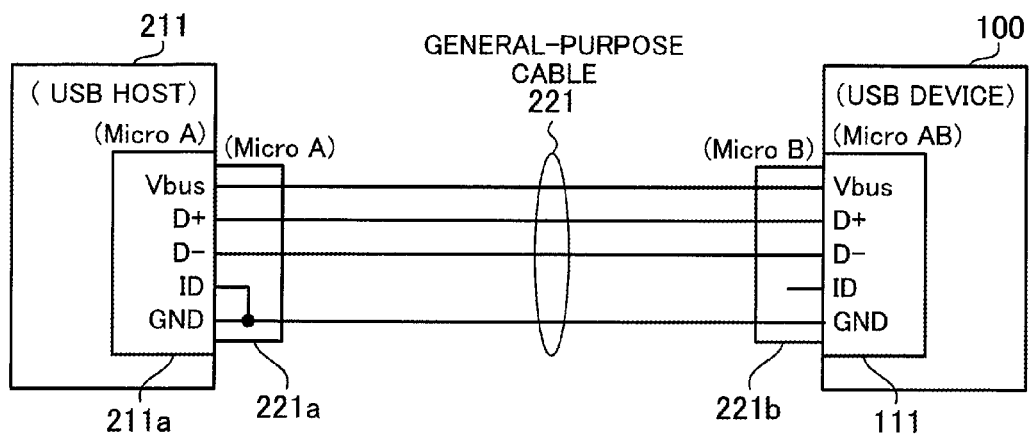
FIG. 8 is a diagram illustrating a cable connected to an information processing apparatus and a connection relation between terminals.
Figure 9:
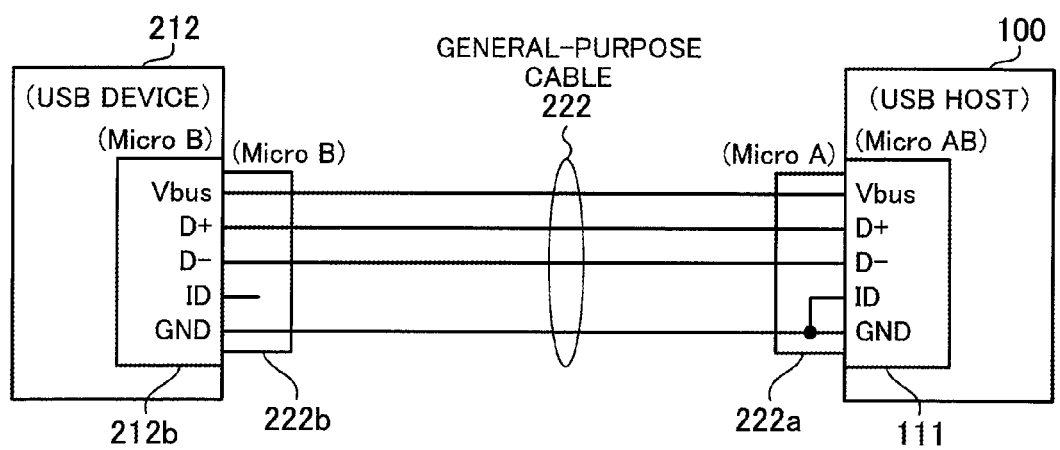
FIG. 9 is a diagram illustrating a cable connected to an information processing apparatus and a connection relation between terminals.
Figure 10:
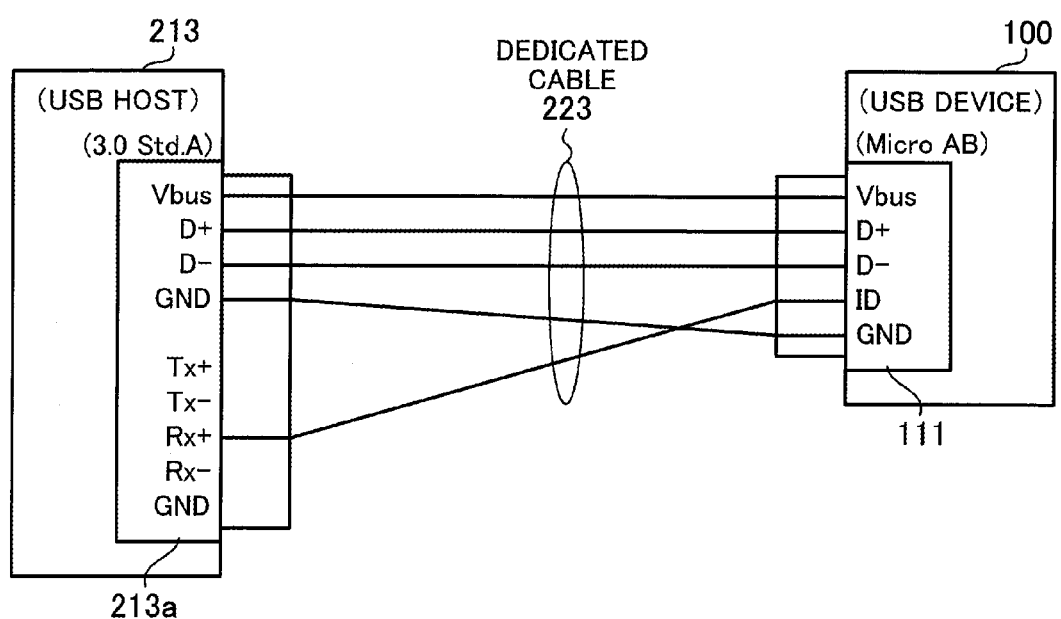
FIG. 10 is a diagram illustrating a cable connected to an information processing apparatus and a connection relation between terminals.

Next, FIG. 8 to FIG. 10 are diagrams illustrating a cable connected to information processing apparatuses and a connection relation between terminals. The cable connected to the information processing apparatus 100 of the embodiment is described using these FIG. 8 to FIG. 10. Note that, in FIG. 8 to FIG. 10, the USB socket 111 of the information processing apparatus 100 is assumed to be a micro AB socket, but the USB socket 111 may be a mini-AB socket. The mini-AB socket has the terminals similar to the terminals of the micro AB socket.

When a USB 2.0 device is connected to the information processing apparatus 100, a general-purpose USB cable is connected to the USB socket 111 of the information processing apparatus 100. According to the USB standard, an A type plug is provided at one end of the cable and a B type plug is provided at the other end. The A type plug is connected to a USB host and the B type plug is connected to a USB device.

For example, as illustrated in FIG. 8, when a USB host supporting the USB 2.0 standard is connected to the information processing apparatus 100, a general-purpose cable 221 with a micro B plug 221b is used. Then, a micro B plug 221b of the general-purpose cable 221 is connected to the USB socket 111 of the information processing apparatus 100. Moreover, in the example of FIG. 8, the electronic device 211 serving as a USB host has a micro A socket 211a, and a micro A plug 221a of the general-purpose cable 221 is connected to the micro A socket 211a of the electronic device 211.

On the other hand, for example, as illustrated in FIG. 9, when a USB device supporting the USB 2.0 standard is connected to the information processing apparatus 100, a general-purpose cable 222 with a micro A plug 222a is used. Then, the micro A plug 222a of the general-purpose cable 222 is connected to the USB socket 111 of the information processing apparatus 100. Moreover, in the example of FIG. 9, because the electronic device 212 serving as a USB device has the micro B socket 212b, the micro B plug 222b of the general-purpose cable 222 is connected to the micro B socket 212b of the electronic device 212.

Here, in the general-purpose cables 221 and 222 supporting the USB OTG standard, the ID terminal and the GND terminal on the USB host side are wired to each other inside the cable or inside the plug, while the ID terminal on the USB device side is wired to nothing to enter an open state. An OTG device may determine whether or not the other connected device is a USB device by detecting such a difference in the method for wiring the ID terminal. The determination method therefor is described later.

Note that, in the example of FIG. 8, the electronic device 211 has the micro A socket 211a, but may have a mini A socket in place of the micro A socket 211a. Because the mini A socket has the terminals similar to the terminals of the micro A socket 211a, the wiring state between the sockets is similar to the wiring state of FIG. 8 even if the electronic device 211 has the mini A socket.

Similarly, in the example of FIG. 9, the electronic device 212 has the micro B socket 212b, but may have the mini B socket in place of the micro B socket 212b. Because the mini B socket has the terminals similar to the terminals of the micro B socket 212b, the wiring state between the sockets is similar to the wiring state of FIG. 9 even if the electronic device 212 has the mini B socket.

Although not illustrated, the cases where a USB host supporting the USB 2.0 standard is connected to the information processing apparatus 100 also include a case where the USB host has the standard A socket. For the purpose of connection with such a USB host, a general-purpose cable with the standard A plug and the micro B plug is used. In this case, a connected USB host is a USB 2.0 device not supporting the USB OTG standard, and the ID terminal is not provided in the standard A socket. As described above, when a USB device is connected to a USB host supporting the USB 2.0 standard but not supporting the USB OTG standard, the ID terminal on the USB device side (i.e., on the information processing apparatus 100 side) is not used.

Next, an example of the case where a USB host supporting the USB 3.0 standard is connected to the information processing apparatus 100 is illustrated in FIG. 10. An electronic device 213 operates as a USB host supporting the USB 3.0 standard, and has, for example, a standard A socket 213a supporting the USB 3.0 standard. The standard A socket 213a includes the Vbus terminal, D+ terminal, D− terminal, and the GND terminal respectively specified by the USB 2.0 standard, and the Tx+ terminal, Tx− terminal, Rx+ terminal, Rx− terminal, and the GND terminal respectively specified by the USB 3.0 standard.

For the purpose of connection between such an electronic device 213 and the information processing apparatus 100, a dedicated cable 223 as illustrated in FIG. 10 is used. Through the dedicated cable 223, the Vbus terminals, D+ terminals, D− terminals, and GND terminals of the USB 2.0 standard on the USB host side and the USB device side are wired to each other, respectively. Thus, the electronic device 213 and the information processing apparatus 100 may communicate according to the USB 2.0 standard (however, excluding the USB OTG standard).

Moreover, through the dedicated cable 223, the ID terminal on the USB device side and the Rx+ terminal or Rx− terminal on the USB host side are wired to each other. The ID terminal is used when it has been connected to a device supporting the USB OTG standard, but not used when it has been connected to a device supporting the USB 3.0 standard. Then, in the embodiment, the ID terminal is connected to the Rx+ terminal or Rx− terminal using the dedicated cable 223 so that the information processing apparatus 100 may confirm the presence of the termination resistor Rt through the ID terminal and thus recognize that a USB host supporting the USB 3.0 standard has been connected.

That is, when a USB host supporting the USB 3.0 standard has been connected to the information processing apparatus 100, the ID terminal of the information processing apparatus 100 is connected to the Rx+ terminal or Rx− terminal of the USB host as illustrated in FIG. 10. Then, the information processing apparatus 100 recognizes that the ID terminal has been terminated by the termination resistor Rt of the USB host, and thus determines that the connected USB host supports the USB 3.0 standard. On the other hand, when a USB host supporting the USB 2.0 standard has been connected to the information processing apparatus 100, the ID terminal of the information processing apparatus 100 enters an open state as illustrated in FIG. 8. Then, the information processing apparatus 100 determines that the connected USB host does not support the USB 3.0 standard.

Figure 11:
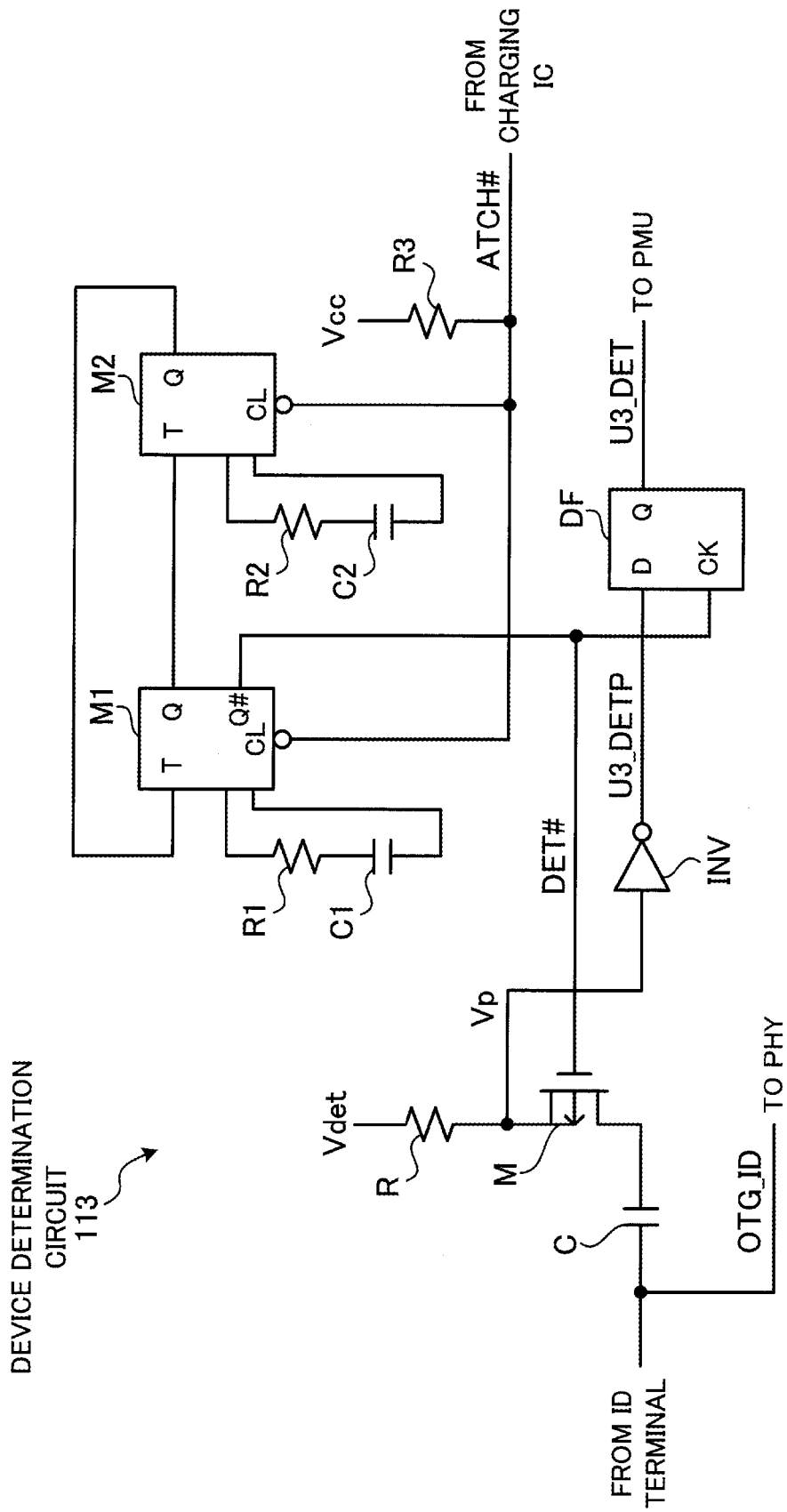
FIG. 11 is a diagram illustrating a configuration example of a device determination circuit.

Next, FIG. 11 is a diagram illustrating a configuration example of the device determination circuit. The information processing apparatus 100 executes the above-described connection detection operation through the ID terminal by using the device determination circuit 113. Note that, in FIG. 11, the constituent elements corresponding to FIG. 5 and FIG. 6 are referred to as the same reference signs.

The device determination circuit 113 includes the resistor R, the coupling capacitor C, a transistor M, multivibrators M1 and M2, an inverter INV, and a D flip-flop DF.

The resistor R and coupling capacitor C correspond to the resistor R and coupling capacitor C illustrated in FIG. 5, and the transistor M corresponds to the switch SW illustrated in FIG. 5. The transistor M is a P channel MOS-FET (Metal Oxide Semiconductor-Field Effect Transistor), and turns on or off the current flowing from the resistor R to the coupling capacitor C in response to a pulse inversion signal DET#, which is obtained by inverting a determination pulse signal DET, input to the gate terminal.

The terminal of the coupling capacitor C on the opposite side of the transistor M is connected to the ID terminal of the USB socket 111, and is connected to the Rx+ terminal or Rx− terminal of the other device when the information processing apparatus 100 is connected to the the other device via the dedicated cable 223 illustrated in FIG. 10. Note that, because the signal line between the coupling capacitor C and the ID terminal of the USB socket 111 is connected also to the PHY 112, the PHY 112 may detect the potential of this signal line as a determination signal OTG_ID.

Both the multivibrators M1 and M2 are monostable multivibrators, and constitute a ring counter by an output pulse of one of the multivibrators M1 and M2 being input to the other one. Then, from an inversion output terminal (Q# terminal) of the multivibrator M1, the pulse inversion signal DET# for controlling the on/off of the transistor M is output.

A resistor R1 and a capacitor C1 are connected to the multivibrator M1. The pulse output period of the multivibrator M1, i.e., the period during which the transistor M is turned on, is determined by the resistance value of the resistor R1 and the capacitance of the capacitor C1. Moreover, a resistor R2 and a capacitor C2 are connected to the multivibrator M2. The pulse output period of the multivibrator M2, i.e., the period during which the transistor M is turned off, is determined by the resistance value of the resistor R2 and the capacitance of the capacitor C2.

Furthermore, the pulse inversion signal DET# is input also to a clock terminal of the D flip-flop DF. The observation voltage Vp between the resistor R and the transistor M is applied to the inverter INV. The inverter INV is a Schmitt trigger type inverter, shapes and inverts the waveform of the observation voltage Vp and supplies the resulting signal to the data terminal of the D flip-flop DF.

The D flip-flop DF latches the level of an output voltage U3_DETP coming from the inverter INV at a rising timing (i.e., a timing when the transistor M is turned off from on) of the pulse inversion signal DET#. The D flip-flop DF outputs to the PMU 122 a connection determination signal U3_DET indicative of whether a USB host supporting the USB 3.0 standard has been connected, according to the droop time of the observation voltage Vp.

Note that the connection inversion signal ATCH# is inverted and input to a clear terminal of each of the multivibrators M1 and M2. The connection inversion signal ATCH# is a signal output from the charging IC 121, and becomes a high level when a power-supply voltage is applied to the Vbus terminal of the USB socket 111, and becomes a low level when it is not applied. The potential of the high level of the connection inversion signal ATCH# is determined by a reference voltage Vcc and a resistor R3. The determination processing related to the other device connected to the information processing apparatus 100 is executed during an initial period when the other device is connected. Here, when the other device is a USB host that is not an OTG device, a power-supply voltage is applied to the Vbus terminal from the very beginning of connection, while when the other device is an OTG device, a power-supply voltage is not applied to the Vbus terminal at the very beginning of connection.

Therefore, in a predetermined period at the initial stage, during which the other device is connected to the information processing apparatus 100, it is determined that an OTG device is connected to the information processing apparatus 100, when a power-supply voltage is not applied to the Vbus terminal. In this state, the connection inversion signal ATCH# becomes a low level. Then, the multivibrators M1 and M2 are stopped to output pulses and thus the pulse inversion signal DET# is maintained at a high level and the transistor M is turned off. In this state, the information processing apparatus 100 may determine whether the connected OTG device is a USB host or a USB device, based on the determination signal OTG_ID input to the PHY 112.

Figure 12:
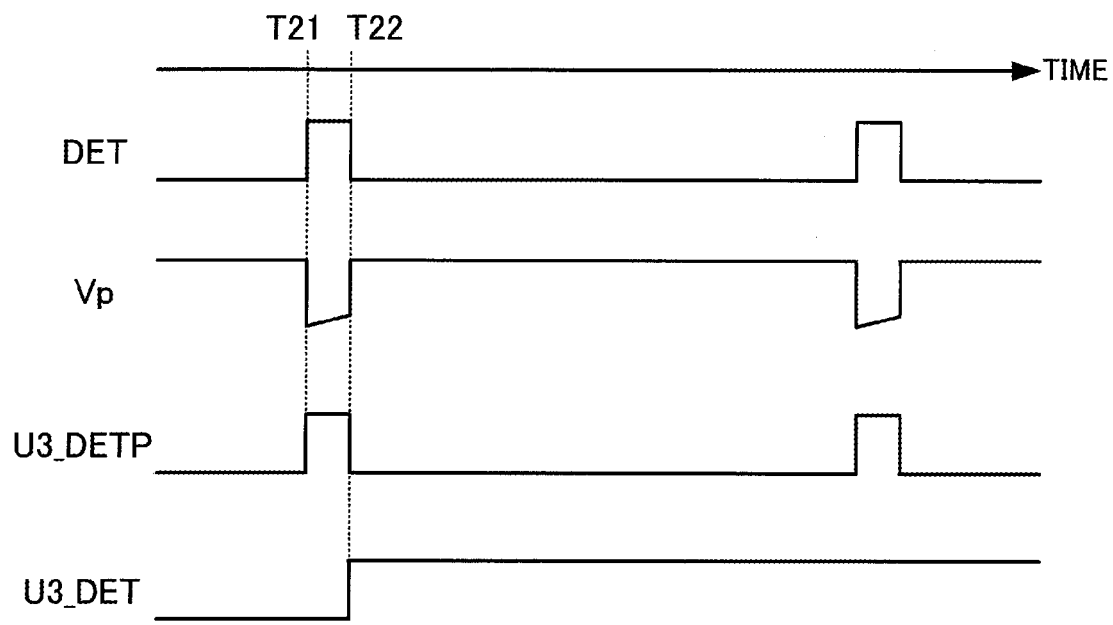
FIG. 12 is a chart illustrating an example of waveforms in the device determination circuit.
Figure 13:
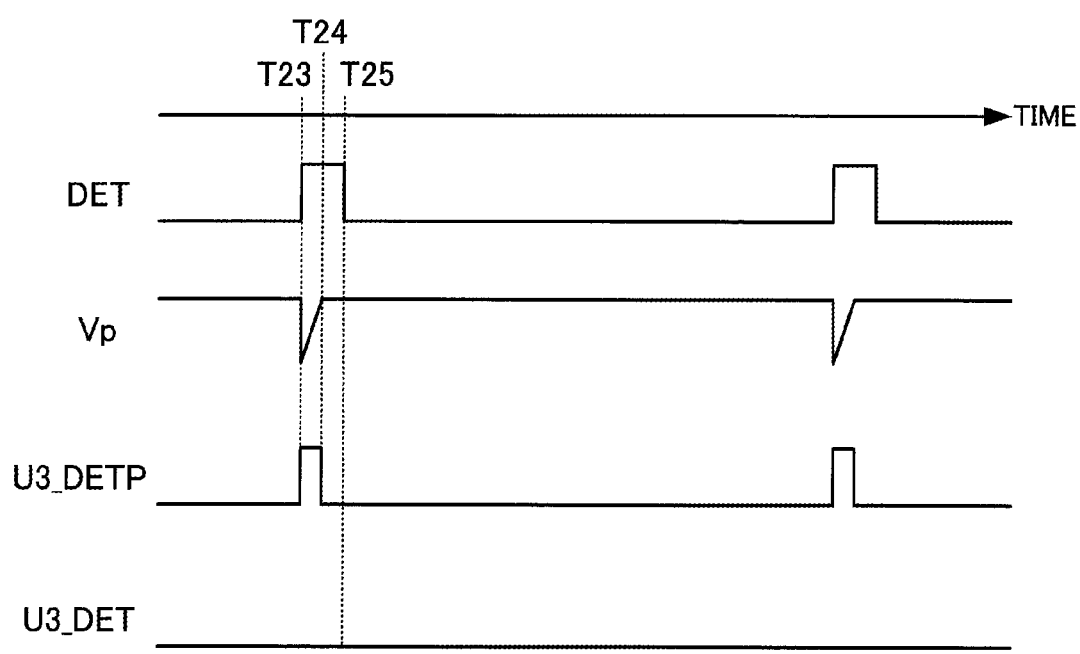
FIG. 13 is a chart illustrating an example of waveforms in the device determination circuit.

FIG. 12 and FIG. 13 are diagrams illustrating an example of the waveforms in the device determination circuit. The operation of the device determination circuit 113 is described using these FIG. 12 and FIG. 13. Note that, in both FIG. 12 and FIG. 13, assume that the connection inversion signal ATCH# is at a high-level.

The determination pulse signal DET illustrated in FIG. 12 and FIG. 13 has an inverted waveform of the pulse inversion signal DET#, and indicates that when the determination pulse signal DET is at a high level, the transistor M is turned on. As described in FIG. 5 to FIG. 7, the droop time of the observation voltage Vp when the transistor M is turned on (i.e., the time period during which the observation voltage Vp falls below a certain voltage) is longer in the case where a USB host supporting the USB 3.0 standard is connected than in the case where a USB host not supporting the USB 3.0 standard is connected. When the former droop time is represented by t11 and the latter droop time by t12, the time period during which the transistor M is turned on (time period during which the pulse inversion signal DET# is set to a low level) is set longer than t11 and shorter than t12.

In the case where a USB host supporting the USB 3.0 standard is connected to the information processing apparatus 100, the observation voltage Vp becomes equal to or smaller than a predetermined voltage from a timing T21 at which the transistor M is turned on to a timing T22 at which the transistor M is turned off, as illustrated in FIG. 12. Therefore, the output voltage U3_DETP from the inverter INV becomes a high level in the period between the timing T21 and the timing T22, and the connection determination signal U3_DET from the D flip-flop DF becomes a high level at the timing T22.

On the other hand, in the case where a USB host not supporting the USB 3.0 standard is connected to the information processing apparatus 100, the observation voltage Vp becomes equal to or smaller than the predetermined voltage at a timing T23 when the transistor M is turned on, as illustrated in FIG. 13. However, because the observation voltage Vp becomes larger than the predetermined voltage at a timing T24 prior to a timing T25 when the transistor M is turned off, the output voltage U3_DETP from the inverter INV also becomes a high level in the period between the timing T23 and the timing T24. Therefore, at the timing T25 when the transistor M is turned off, the output voltage U3_DETP from the inverter INV becomes a low level, and the connection determination signal U3_DET from the D flip-flop DF at the timing T25 remains also at a low level.

As described above, the connection determination signal U3_DET output from the device determination circuit 113 becomes a high level when a USB host supporting the USB 3.0 standard has been connected to the information processing apparatus 100. When the connection determination signal U3_DET becomes a high level, the PMU 122 notifies the CPU 101 via the SCU 103 that a USB host supporting the USB 3.0 standard has been connected. With such an operation, the information processing apparatus 100 may, though not having a function to communicate according to the USB 3.0 standard, recognize that a USB host supporting the USB 3.0 standard has been connected.

Note that, Patent Literature 1 describes a technique of recognizing that a USB host supporting the USB 3.0 standard has been connected, based on the potential of a communication ground terminal (drain terminal) in the USB 3.0 standard. However, because the data signal line of the USB 3.0 standard is a differential signal line, the drain terminal does not necessarily need to be grounded but may be in an open state. For example, by the drain terminal being set to the earth potential, a ground loop current may be generated and a common mode noise may increase, which is not preferable.

Accordingly, when based on the potential of the drain terminal, it is not possible to accurately recognize that a USB host supporting the USB 3.0 standard has been connected. In contrast, the information processing apparatus 100 of the embodiment may accurately recognize that a USB host supporting the USB 3.0 standard has been connected, by being based on the potential of the Rx+ terminal or Rx− terminal that is reliably terminated with the termination resistor Rt.

Figure 14:
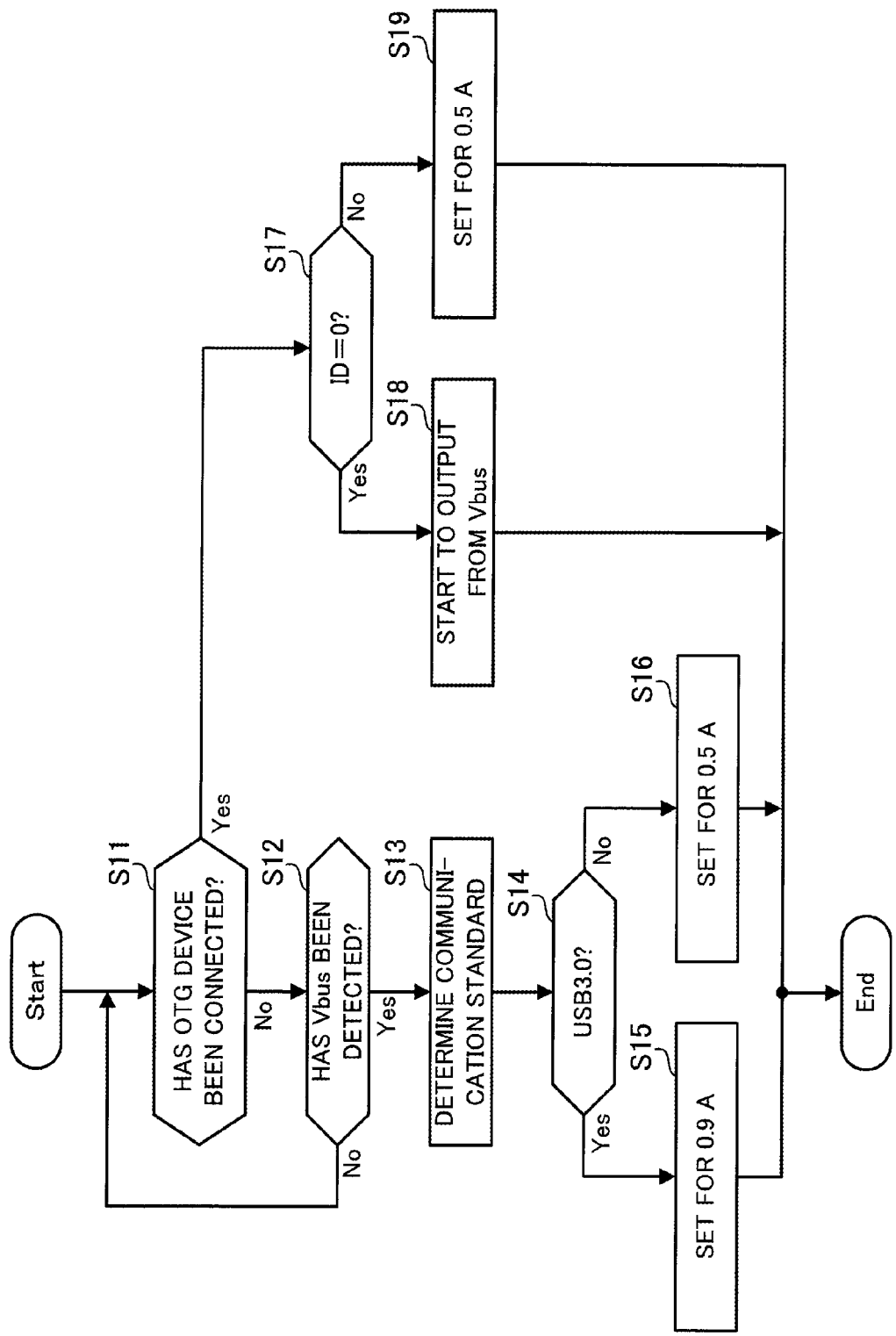
FIG. 14 is a flowchart illustrating an example of the procedure for determining a connected device in an information processing apparatus.

FIG. 14 is a flowchart illustrating an example of the procedure for determining a connected device in the information processing apparatus. Note that, in the initial state of the processing of FIG. 14, the connection inversion signal ATCH# output to the device determination circuit 113 from the charging IC 121 is set to a low level.

[Step S11] The PMU 122 causes the charging IC 121 to execute each of the operations of probing and sensing under the control of the CPU 101. The probing is an operation to determine whether the other device is connected, by applying the connection detection pulse to the Vbus terminal at constant intervals. Moreover, the sensing is an operation to detect the probing performed by the other connected device. The PMU 122, when determining that the other device has been connected, by probing or sensing, notifies the CPU 101 of this fact through the SCU 103. When it is determined that the other device has been connected, by probing or sensing, the CPU 101 determines that an OTG device has been connected. Note that the probing and sensing are described later.

The CPU 101, when determining that an OTG device has been connected, executes the process of Step S17. On the other hand, the CPU 101, when unable to determine that an OTG device has been connected within a fixed time, executes the process of Step S12.

[Step S12] As described above, when a USB host other than an OTG device has been connected, the power-supply voltage is applied to the Vbus terminal from the connected USB host. The PHY 112, when detecting that a power-supply voltage has been applied to the Vbus terminal from the other device, notifies the CPU 101 of this fact. At the same time, the charging IC 121, when detecting that the power-supply voltage has been applied to the Vbus terminal from the other device, changes the connection inversion signal ATCH#, which is output to the device determination circuit 113, from a low level to a high level.

When application of the power-supply voltage to the Vbus terminal is detected, the CPU 101 executes the process of Step S13. On the other hand, when application of the power-supply voltage to the Vbus terminal is not detected within a fixed time, the CPU 101 executes the process of Step S11. Note that, in the latter case, the CPU 101 causes the PHY 112 to pull up the potential of the D+ terminal or D− terminal, thereby causing the other device to recognize that the information processing apparatus 100 has been connected.

The processes of Steps S11 and S12 are repeated at a fixed cycle.

[Step S13] The CPU 101 determines whether or not a connected USB host supports the USB 3.0 standard, based on the determination result of the device determination circuit 113.

By the connection inversion signal ATCH# becoming a high level in Step S12, the multivibrator M1 starts to output the pulse signal and thus the transistor M is turned on at constant intervals. As described in FIG. 9, when a connected USB host supports the USB 3.0 standard, the connection determination signal U3_DET output from the device determination circuit 113 to the PMU 122 becomes a high level. When the connection determination signal U3_DET becomes a high level, the PMU 122 notifies the CPU 101 that a USB host supporting the USB 3.0 standard has been connected.

[Step S14] When it is determined that the connected USB host supports the USB 3.0 standard, the process of Step S15 is executed, while when it is determined that it does not support the USB 3.0 standard, the process of Step S16 is executed.

[Step S15] The CPU 101 instructs the PMU 122 to perform the setting appropriate for an input current of 0.9 A. The PMU 122 performs the setting for setting the upper limit of the charging current of the battery 130 to 0.9 A, with respect to the charging IC 121, and causes the charging IC 121 to start charging of the battery 130. Moreover, the PMU 122 switches the output operation of a system voltage performed by the charging IC 121 from an output operation based on the voltage of the battery 130 to an output operation based on the voltage of the Vbus terminal.

[Step S16] The CPU 101 instructs the PMU 122 to perform the setting appropriate for the input current of 0.5 A. The PMU 122 performs the setting for restricting the upper limit of the charging current of the battery 130 to 0.5 A, with respect to the charging IC 121, and causes the charging IC 121 to start charging of the battery 130. Moreover, the PMU 122 switches the output operation of a system voltage performed by the charging IC 121 from an output operation based on the voltage of the battery 130 to an output operation based on the voltage of the Vbus terminal.

Note that, when the remaining capacity of the battery 130 is the same, the time taken for charging in Step S15 is shorter than the time taken for charging in Step S16.

[Step S17] When it is determined, in Step S11, that an OTG device has been connected, the connection inversion signal ATCH# output to the device determination circuit 113 from the charging IC 121 remains at a low level, and the transistor M of the device determination circuit 113 remains off. In this state, the information processing apparatus 100 determines whether a connected OTG device is a USB host or a USB device, based on the OTG_ID signal indicative of the potential of the ID terminal and according to the procedure specified by the USB OTG standard.

When the connected OTG device is a USB device, the PHY 112 detects that the potential of the ID terminal is the earth potential (i.e., ID=0), and notifies the CPU 101 of this fact. On the other hand, when the connected OTG device is a USB host, the PHY 112 detects that the potential of the ID terminal is not the earth potential, and notifies the CPU 101 of this fact.

The CPU 101, when determining that ID=0, executes the process of Step S18, while when determining that ID≠0, executes the process of Step S19.

[Step S18] The CPU 101 instructs the PMU 122 to output the power-supply voltage from the Vbus terminal. The PMU 122 switches the operation state of the charging IC 121 to cause the charging IC 121 to supply a power-supply voltage to the Vbus terminal based on the voltage supplied from the battery 130. Then, the electric power of 0.5 V and 0.5 A is supplied to the other device through the Vbus terminal from the charging IC 121.

[Step S19] The CPU 101 instructs the PMU 122 to perform the setting appropriate for the input current of 0.5 A. The PMU 122 performs the setting for restricting the upper limit of the charging current of the battery 130 to 0.5 A, with respect to the charging IC 121, and causes the charging IC 121 to start charging of the battery 130. Moreover, the PMU 122 switches the output operation of a system voltage performed by the charging IC 121 from an output operation based on the voltage of the battery 130 to an output operation based on the voltage of the Vbus terminal.

Figure 15:
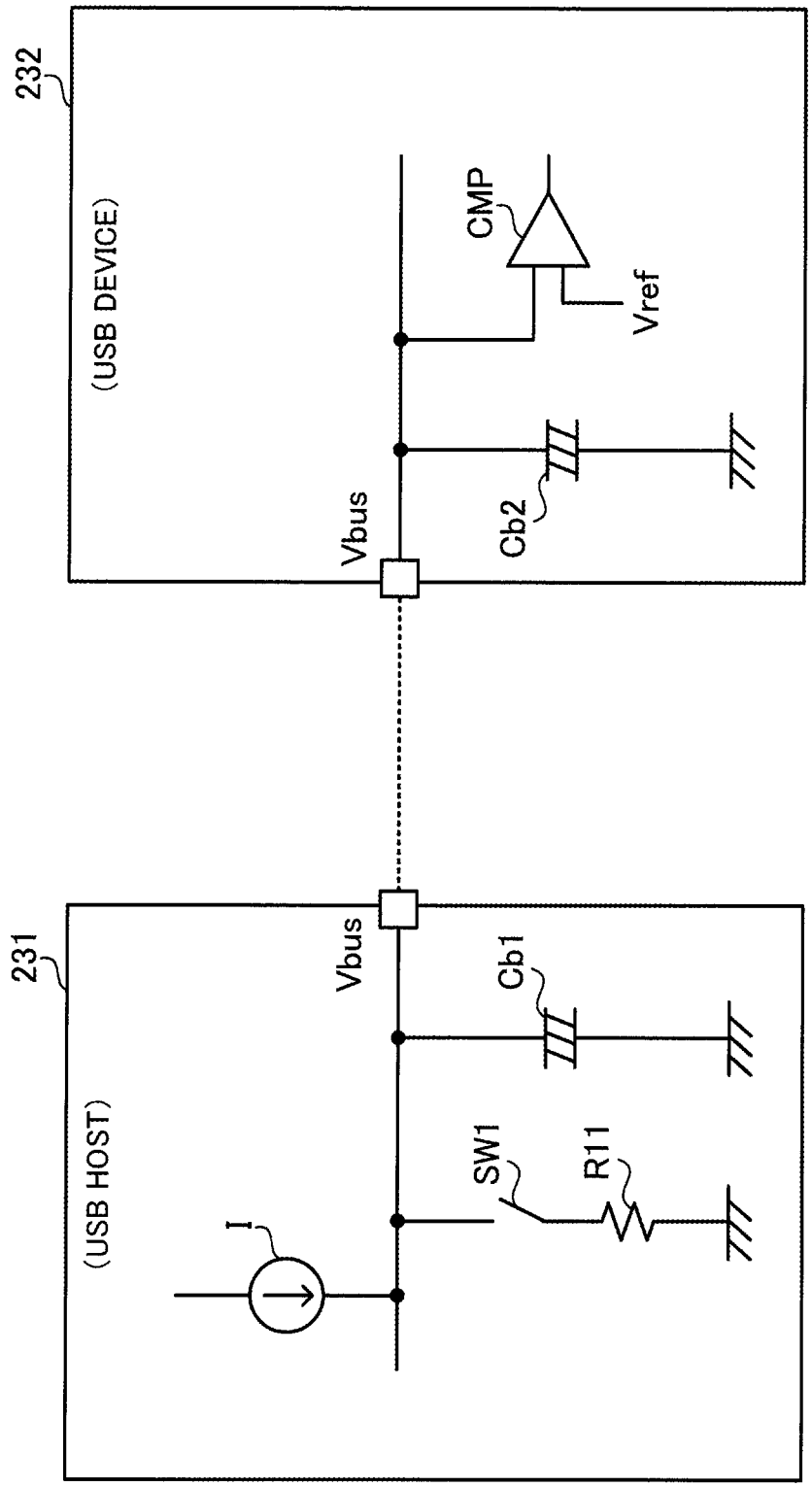
FIG. 15 is a diagram illustrating an example of the circuit configuration for executing operations of probing and sensing.
Figure 16:
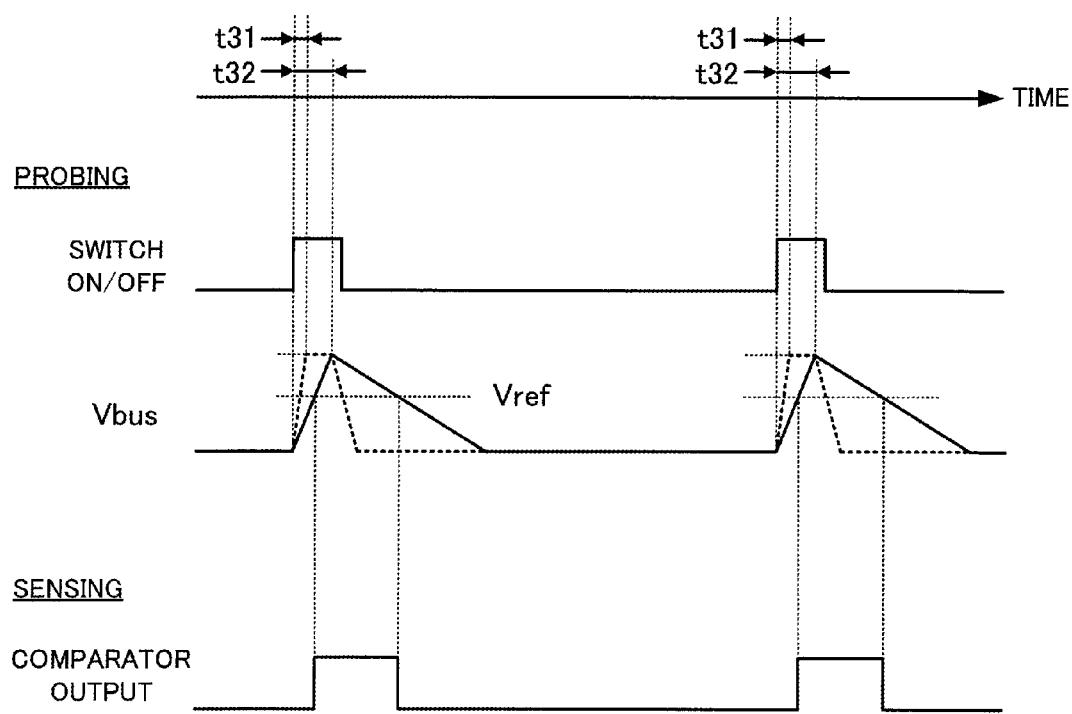
FIG. 16 is a chart illustrating an example of waveforms during execution of probing and sensing.

Here, each of the operations of probing and sensing is described using FIG. 15 and FIG. 16. First, FIG. 15 is a diagram illustrating an example of the circuit configuration for executing the operations of probing and sensing.

In USB 2.0 devices and USB 3.0 devices excluding OTG devices, in principle, a USB host keeps applying a power-supply voltage to the Vbus terminal of the USB host. Then, upon detection of application of a power-supply voltage to the Vbus terminal of a USB device, the USB device recognizes that it has been connected to a USB host and notifies the USB host of this fact.

On the other hand, an OTG device does not apply a power-supply voltage to the Vbus terminal at least until the other device is connected and the OTG device may determine whether the other device is a USB host or a USB device. Instead, the OTG device detects that the other device has been connected, by the operations of probing and sensing using the Vbus terminal.

In USB 2.0 devices including OTG devices, the Vbus terminal is grounded via a bypass capacitor. The bypass capacitor has the capacitance on the order of 1 μF to 6.5 μF. In the example of FIG. 15, the Vbus terminal of an electronic device 231 is grounded via a bypass capacitor Cb1, while the Vbus terminal of an electronic device 232 is grounded via a bypass capacitor Cb2.

Hereinafter, as an example, assume that the electronic device 231 is a USB host supporting the USB OTG standard and the electronic device 232 is a USB device supporting the USB OTG standard. The electronic device 231 includes a current source I for charging the bypass capacitor Cb1, a switch SW1 for discharging the bypass capacitor Cb1, and a resistor R11 connected between the switch SW1 and the ground, as the configuration for probing. On the other hand, the electronic device 232 includes a comparator CMP for comparing the potential of the Vbus terminal with a predetermined reference voltage Vref, as the configuration for sensing.

FIG. 16 is a chart illustrating an example of waveforms during execution of probing and sensing.

The electronic device 231 performs the probing as follows. The electronic device 231 periodically turns on the switch SW1 only for a fixed period while causing the current source I to output a constant current. The switch on/off waveform of FIG. 16 is the waveform indicative of the on/off state of the switch SW1. Moreover, the Vbus waveform of FIG. 16 is the waveform indicative of the potential of the Vbus terminal of the electronic device 231. The solid line illustrates a waveform when the electronic device 232 has been connected while the dotted line illustrates a waveform when the other device including the electronic device 232 is not connected.

The bypass capacitor is charged by the switch SW1 being turned on from off. When the other device including the electronic device 232 is not connected to the electronic device 231, only the bypass capacitor Cb1 of the electronic device 231 is charged. On the other hand, when the electronic device 232 has been connected to the electronic device 231, the bypass capacitor Cb2 of the electronic device 232 together with the bypass capacitor Cb1 of the electronic device 231 is also charged. That is, because the charge capacitance varies depending on whether the other device is connected to the electronic device 231, the time taken for charging also varies.

A charging time t31 when the other device is not connected to the electronic device 231 is shorter than a charging time t32 when the electronic device 232 has been connected to the electronic device 231. The electronic device 231 determines whether or not the other device has been connected by determining a difference in such a charging time, by probing.

On the other hand, the electronic device 232 performs the sensing as follows. The output of the comparator CMP of the electronic device 232 becomes a high level when the potential of the Vbus terminal exceeds the reference voltage Vref, while when the potential of the Vbus terminal is equal to or smaller than the reference voltage Vref, the output of the comparator CMP becomes a low level. Accordingly, while the other device connected to the electronic device 232 is performing probing, the comparator CMP outputs a pulse waveform at constant intervals. The electronic device 232 determines that the other device has been connected, when the pulse waveform is output at constant intervals from the comparator CMP.

Note that the probing may be executed not only by a USB host but a USB device. Moreover, the sensing may be also executed not only by a USB device but a USB host. Accordingly, the information processing apparatus 100 of the embodiment includes either one of the bypass capacitors Cb1 and Cb2 of FIG. 15, and also includes the current source I, switch SW1, and resistor R11 that are the constituent elements for probing and the comparator CMP that is the constituent element for sensing. The bypass capacitor, current source I, switch SW1, resistor R11, and comparator CMP are provided inside the charging IC 121, for example. Then, in Step S11 in FIG. 14, the information processing apparatus 100 determines whether an OTG device has been connected, by performing at least one of probing and sensing.

The above-described information processing apparatus 100 may, though not having a function to communicate according to the USB 3.0 standard, recognize that a USB host supporting the USB 3.0 standard has been connected. Accordingly, when a USB host supporting the USB 3.0 standard has been connected, the charging time may be reduced by optimizing the setting of the charging IC 121 for charging the battery 130 to the current of 0.9 A supplied from the Vbus terminal.

The information processing apparatus 100 may accurately determine that a USB 3.0 device has been connected, by connecting to the reception terminal (Rx+ terminal or Rx− terminal) of the USB 3.0 device via the Vbus terminal of the USB socket 111.

Furthermore, because such connection determination of a USB 3.0 device is performed using a socket supporting the USB OTG standard as it is, the compatibility of connection with the USB 2.0 devices including OTG devices may be maintained. Moreover, because a terminal dedicated for the connection determination of a USB 3.0 device does not need to be provided, the installation area of the socket in the information processing apparatus 100 and the manufacturing cost of the information processing apparatus 100 may be suppressed.

According to an aspect of the embodiments disclosed herein, an electronic device may detect the connection of a device supporting a communication standard, which the electronic device does not support.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that various changes, substitutions, and alterations could be made hereto without departing from the spirit and scope of the invention.

What is claimed is:

1. An electronic device comprising:
a communication connector including a power supply terminal and a plurality of signal terminals;
a determiner configured to determine, based on a potential of an ID terminal specified by a Universal Serial Bus (USB) On-The-Go (OTG) standard among the plurality of signal terminals, whether a device connected via the communication connector is a device capable of communicating according to a USB 3.0 standard; and
a setting controller configured to switch a setting of a maximum consumption current related to a power supply signal input from the power supply terminal to either one of a first current value specified by a USB 2.0 standard and a second current value specified by the USB 3.0 standard, according to a determination result of the determiner.

2. The electronic device according to claim 1, wherein a communication cable, to which a reception terminal for receiving data according to the USB 3.0 standard among terminals of another connected device and the ID terminal are wired, is connected to the communication connector.

3. The electronic device according to claim 1, wherein the determiner:
determines whether a connected device is a device capable of communicating according to the USB 3.0 standard, based on the voltage of the ID terminal, when detecting that the power supply signal has been input from the power supply terminal; and
executes determination processing specified by the USB OTG standard, based on the potential of the ID terminal, when detecting that another device has been connected, based on a connection detection signal transmitted to the power supply terminal.

4. The electronic device according to claim 3, wherein the determiner determines whether or not another connected device is a host device specified by the USB 2.0 standard, based on the potential of the ID terminal, when detecting that the another device has been connected, based on the connection detection signal.

5. The electronic device according to claim 3, wherein
the determiner includes a coupling capacitor connected to the ID terminal, and a determination signal output circuit configured to output a determination signal to the ID terminal via the coupling capacitor, and determines whether a connected device is a device capable of communicating according to the USB 3.0 standard, from a variation state of a potential between the coupling capacitor and the determination signal output circuit when the determination signal is output, and wherein
the determination signal output circuit outputs the determination signal, when detecting that the power supply signal has been input from the power supply terminal.

6. The electronic device according to claim 1, wherein the determiner determines whether a termination resistor is connected to the ID terminal, based on the potential of the ID terminal, and determines whether a device connected via the communication connector is a device capable of communicating according to the USB 3.0 standard, from a determination result of whether the termination resistor is connected.

7. A method for controlling an electronic device having a communication connector including a power supply terminal and a plurality of signal terminals, the method comprising:
determining, based on a potential of an ID terminal specified by a Universal Serial Bus (USB) On-The-Go (OTG) standard among the plurality of signal terminals, whether a device connected via the communication connector is a device capable of communicating according to a USB 3.0 standard; and
switching a setting of a maximum consumption current related to a power supply signal input from the power supply terminal to either one of a first current value specified by a USB 2.0 standard and a second current value specified by the USB 3.0 standard, according to the determination result.

8. The method for controlling an electronic device according to claim 7, wherein a communication cable, to which a reception terminal for receiving data according to the USB 3.0 standard among terminals of another connected device and the ID terminal are wired, is connected to the communication connector.

9. The method for controlling an electronic device according to claim 7, wherein
the determining includes:
determining whether a connected device is a device capable of communicating according to the USB 3.0 standard, based on the voltage of the ID terminal, when detecting that the power supply signal has been input from the power supply terminal; and
executing determination processing specified by the USB OTG standard, based on the potential of the ID terminal, when detecting that another device has been connected, based on a connection detection signal transmitted to the power supply terminal.

10. The method for controlling an electronic device according to claim 9, wherein the determining includes determining whether or not another connected device is a host device specified by the USB 2.0 standard, based on the potential of the ID terminal, when detecting that the another device has been connected, based on the connection detection signal.

11. The method for controlling an electronic device according to claim 9, wherein
the electronic device includes a coupling capacitor connected to the ID terminal, and a determination signal output circuit configured to output a determination signal to the ID terminal via the coupling capacitor, wherein
the determining includes:
causing the determination signal output circuit to output the determination signal when detecting that the power supply signal has been input from the power supply terminal; and
determining whether a connected device is a device capable of communicating according to the USB 3.0 standard, from a variation state of a potential between the coupling capacitor and the determination signal output circuit when the determination signal is output.

12. The method for controlling an electronic device according to claim 7, wherein the determining includes: determining whether a termination resistor is connected to the ID terminal, based on the potential of the ID terminal; and determining whether a device connected via the communication connector is a device capable of communicating according to the USB 3.0 standard, from a determination result of whether the termination resistor is connected.

13. An electronic device comprising:
a communication connector including a power supply terminal and a plurality of signal terminals;
a determiner configured to determine, based on a potential of an ID terminal specified by a Universal Serial Bus (USB) On-The-Go (OTG) standard among the plurality of signal terminals, whether a device connected via the communication connector is a device capable of communicating according to a USB 3.0 standard; and
a setting controller configured to switch a setting related to a power supply signal input from the power supply terminal according to a determination result of the determiner,
wherein a communication cable, to which one of an Rx+ terminal and an Rx− terminal of another connected device and the ID terminal are wired, is connected to the communication connector, the Rx+ terminal and the Rx− terminal being specified by the USB 3.0 standard.

14. A method for controlling an electronic device having a communication connector including a power supply terminal and a plurality of signal terminals, the method comprising:
determining, based on a potential of an ID terminal specified by a Universal Serial Bus (USB) On-The-Go (OTG) standard among the plurality of signal terminals, whether a device connected via the communication connector is a device capable of communicating according to a USB 3.0 standard; and
switching a setting related to a power supply signal input from the power supply terminal according to the determination result,
wherein a communication cable, to which one of an Rx+ terminal and an Rx− terminal of another connected device and the ID terminal are wired, is connected to the communication connector, the Rx+ terminal and the Rx− terminal being specified by the USB 3.0 standard.

* * * * *